United States Patent [19]
Sakai

[11] Patent Number: 5,075,715
[45] Date of Patent: Dec. 24, 1991

[54] FLASH DEVICE WITH CHARGING COMPLETION CONTROL FEATURE

[75] Inventor: Shinji Sakai, Yokohama, Japan

[73] Assignee: Canon Kabushiki Kaisha, Tokyo, Japan

[21] Appl. No.: 499,979

[22] Filed: Mar. 27, 1990

[30] Foreign Application Priority Data

Mar. 27, 1989 [JP] Japan .................................. 1-74627
Mar. 27, 1989 [JP] Japan .................................. 1-74628

[51] Int. Cl.⁵ .................................................. G03B 7/16
[52] U.S. Cl. .................................. 354/421; 354/145.1
[58] Field of Search ............... 354/421, 415, 416, 417, 354/418, 419, 145.1

[56] References Cited

U.S. PATENT DOCUMENTS

4,569,580 2/1986 Kataoka et al. ...................... 354/415

*Primary Examiner*—Richard A. Wintercorn
*Assistant Examiner*—David M. Gray
*Attorney, Agent, or Firm*—Fitzpatrick, Cella, Harper & Scinto

[57] ABSTRACT

A camera is provided to effect flash photography using a flash device, in particular, a camera of the type which actuates a function such as a shutter release function when the charged voltage of the main capacitor of a flash device reaches a predetermined level. In the camera according to this invention, the speed of continuous shooting is improved by adjusting the above predetermined level relative to the charged voltage and minimizing the time required to complete charging.

13 Claims, 8 Drawing Sheets

FLASH DEVICE WITH CHARGING COMPLETION CONTROL FEATURE

BACKGROUND OF THE INVENTION

1. Field of the Invention

The present invention generally relates to cameras provided with a distance measurement means for measuring the distance to an object, a sensitivity detecting means for detecting photographic sensitivity corresponding to the measured distance, and the like. More particularly, the present invention relates to photographic control provided during the operation of a flash device.

2. Description of the Related Art

In a conventional system for detecting the completion of a charging operation in a flash device, a neon lamp, a Zener diode or the like is employed to detect the charged voltage of the main capacitor in a flash device. In the conventional system, when the charged voltage reaches a predetermined value, it is determined that the charging operation is completed.

However, it has recently been pointed out that such a charging completion detecting system has a number of problems. For example, in the case of a camera having a built-in flash, a small battery must be used for charging purposes and a long charge time is required to charge the flash device. In the case of a camera which does not immediately reach its steady operating state, for example, an electronic camera having a disk drive, if the voltage of the battery falls to a great extent due to flash charging, a long time is required for the camera to reach a standby state after the completion of the charging operation. It is therefore necessary to prevent the charging current from becoming excessively large. However, as the charging current is reduced, the charging time increases thereby impairing a camera function, such as a continuous shooting operation.

SUMMARY OF THE INVENTION

It is, therefore, an object of the present invention to provide a photographic apparatus having a charging completion level controlling means for controlling the flash charging completion level of the main capacitor of a flash device on the basis of at least either distance information supplied from a distance measurement means or sensitivity information detected by a sensitivity detecting means. In flash photography, the photographic apparatus sets the flash charging completion level to an appropriate low level in a case where the distance to an object is short, the photographic sensitivity is increased (for example, in an electronic camera, where the photographic sensitivity is increased by switching from a frame mode to a field mode or by increasing the gain of an image signal), or where the photographic sensitivity is effectively increased due to a short object distance.

It is another object of the present invention to provide an apparatus capable of providing proper exposure by controlling exposure adjustment factors such as an aperture value in accordance with the charge level obtained by monitoring the state of electric charge in a flash device. The apparatus is arranged to obtain exposure as close as possible to proper exposure by compensating for the exposure adjustment factors in accordance with, for example, the photographic mode (field mode, frame mode, continuous shooting mode or single shooting mode).

It is another object of the present invention to provide a camera arranged to extend the reach of flash light as far as possible by automatically shifting the photographic mode of the camera to a mode for increasing photographic sensitivity in a case where an object distance is greater than a predetermined distance which can be covered by flash light of the intensity determined by a particular flash device guide number.

The invention in one aspect pertains to a flash photographic apparatus, including a main capacitor and a flash device, which comprises a charging completion signal generating circuit arranged to detect, a charged voltage of the main capacitor of the flash device and to generate a charging operation completion signal when the charged voltage reaches a predetermined level. A distance information generating means generates distance information with respect to an object to be photographed. A level setting circuit increases the predetermined level of the charging operation completion signal generating circuit in accordance with an increase object distance on the basis of the distance information supplied from the distance information generating means. A control circuit responsive to the charged voltage, completion signal actuates a predetermined function of the flash photographic apparatus.

The invention in another aspect pertains to a flash photographic apparatus including a main capacitor and a flash device, which comprises a charging completion signal generating circuit arranged to detect a charged voltage of the main capacitor of the flash device and to generate a charging completion signal when the charged voltage reaches a predetermined level. The charging completion signal generating circuit comprises an image recording circuit having a field mode for recording a scene using one field of information and a frame mode for recording the scene in a single frame using two fields of information as the image recording modes of the flash photography apparatus, and a level setting circuit for setting the predetermined level of the charging completion signal generating circuit to a low level when the field mode is selected and to a high level when the frame mode is selected A control circuit activates a predetermined function of the flash photographic apparatus in response to the charging completion signal received from the charging completion signal generating circuit.

Still another aspect of the invention pertains to a flash photographic apparatus, including a main capacitor and a flash device, which comprises a charging completion signal generating circuit arranged to detect a charged voltage of the main capacitor of the flash device and to generate a charging completion signal when the charged voltage reaches a predetermined level, a mode setting circuit for selecting the photographic mode of the flash photography apparatus, and a level adjustment circuit for adjusting the predetermined level of the charging completion signal generating circuit in accordance with the photographic mode set by the mode setting circuit. A control circuit activates a predetermined function of the flash photographic apparatus in response to the charging completion signal received from the charging completion signal generating circuit.

A further aspect of the invention comprises a camera arranged to effect flash photography by means of flash device comprising a flash means for generating photographic illumination, a distance information generating means for generating distance information With respect to an object to be photographed, a sensitivity setting circuit for setting sensitivity information, an intensity control circuit for controlling the flash means to set the intensity of photographic illumination on the basis c sensitivity information set by the sensitivity setting circuit, and a sensitivity adjustment circuit for determining sensitivity for the sensitivity setting circuit on the basis of the distance information generated by the distance information generating means.

Further objects of the present invention will become apparent from the following detailed description of preferred embodiments of the present invention with reference to the accompanying drawings.

DESCRIPTION OF THE DRAWINGS

FIGS. 3, 4 and 5, consisting of FIG.: 5A and 5B, are flowcharts showing a control program for the camera shown in FIG. 1;

DESCRIPTION OF THE PREFERRED EMBODIMENTS

Embodiments of the present invention will be explained below, in detail, with reference to the accompanying drawings.

Figure 1:
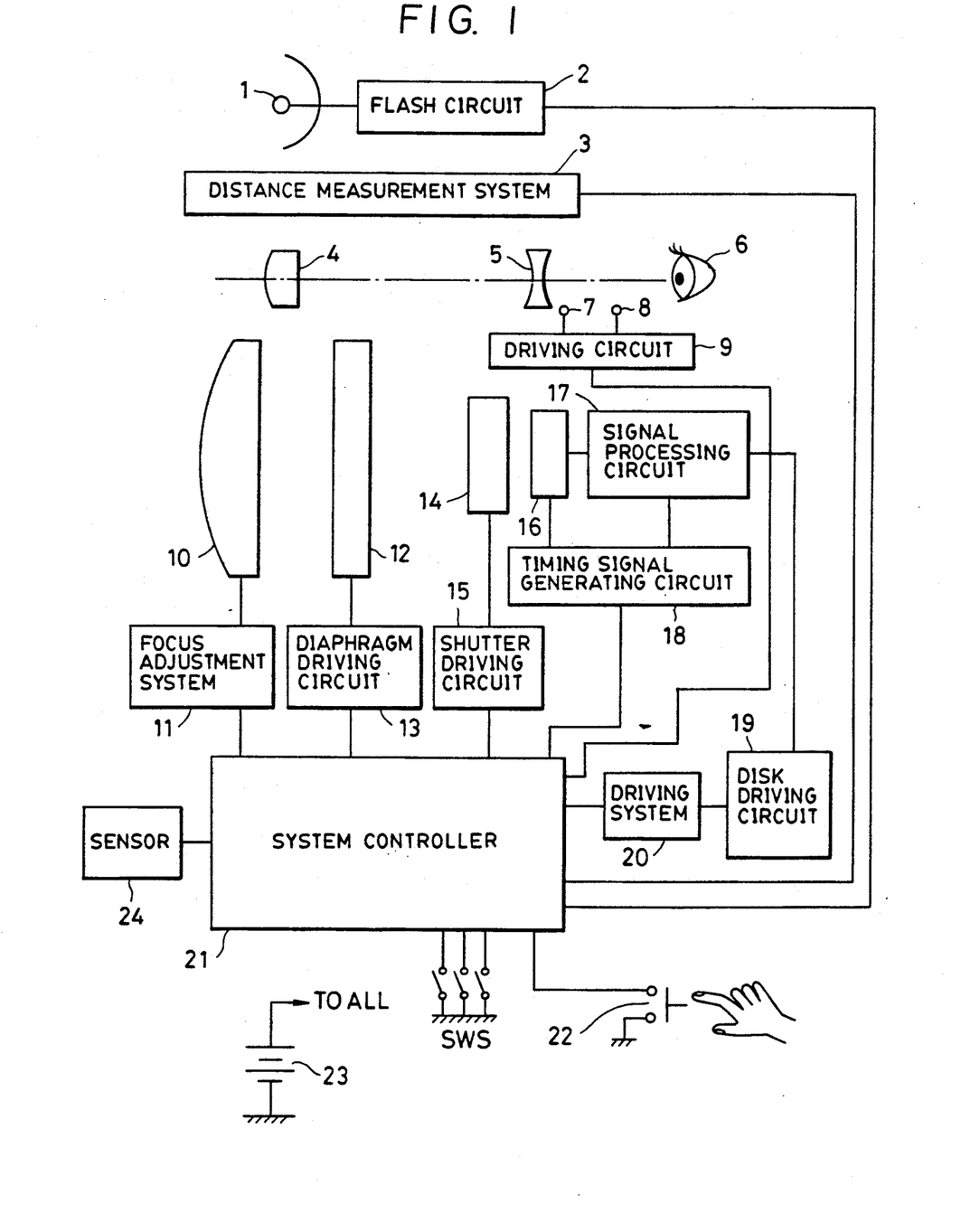
FIG. 1 is a block diagram showing a camera which is provided with a flash photography device according to a first embodiment of the present invention.

FIG. 1 is a block diagram showing a first embodiment of the present invention. Although the first embodiment is applied to a so-called electronic camera, i.e., a still video camera, the present invention is not limited to such an electronic camera and can, of course, be applied to conventional film-type cameras.

The circuit shown in FIG. 1 comprises the following major elements: a flash tube 1, a flash circuit 2 having the functions of controlling charging, starting, and stopping the flash duration, a distance measurement system 3, viewfinder optical systems 4 and 5 through which a user 6 views an object (not shown), indicators 7 and 8 which may be multi-segment light emitting devices disposed at, for example, one side in the viewfinder, a driving circuit 9 for the indicators 7 and 8, a lens element 10, a focus adjustment system 11 for driving the lens element 10, a diaphragm 12, a diaphragm driving circuit 13, a shutter 14, a shutter driving circuit 15, an image sensor 16, a signal processing circuit 17 for converting the output from the image sensor 16 into a signal of a format suitable for recording, a timing signal generating circuit 18 for generating the timing signal required for the operation of, for example, the image sensor 16 or the signal processing circuit 17, a disk driving circuit 19, a driving system 20 including a head-loading mechanism, a spindle-motor driving circuit or the like, a system controller 21, a release button 22, a battery 23 serving as an electrical power source for the entire system, and a sensor 24 used to obtain external data such as photometric data or colorimetric data. When the release button 22 is pressed with a first stroke, a first switch (not shown) is turned on and, when the release button 22 is pressed by a second stroke, a second switch (not shown) is turned on.

The operation of an electronic camera having the arrangement shown in FIG. 1 is as follows.

When the system controller 21 senses that the release button 22 has been pressed with the first stroke, the system controller 21 checks the source voltage of the battery 23 and, depending on the camera type, initializes a disk (not shown). Further, the system controller 21 evaluates external conditions, such as brightness, by means of the sensor 24. If it is determined that the brightness is low, the system controller 21 transmits a charging operation start signal to the flash circuit 2 for the purpose of starting the flash charging operation. The system controller 21 causes the distance measurement system 3 to measure the distance to the object and displays the result using the indicators 7 and 8.

Then, the user 6 confirms the information displayed by the indicators 7 and 8 and, if acceptable, presses the release button 22 with the second stroke while looking at the object through the viewfinder optical systems 4 and 5.

When the system controller 21 senses that the release button 22 has been pressed with the second stroke, the system controller 21 causes the focus adjustment system 11 to move the lens element 10 to a position corresponding to the distance measured by the distance measurement system 3. In addition, the system controller 21 causes the diaphragm driving circuit 13 to set the diaphragm 12 to a predetermined aperture value and activates the image sensor 16 and the signal processing circuit 17 by means of the timing signal generating circuit 18. Then, the system controller 21 drives the shutter 14 through the shutter driving circuit 15.

The optical image thus obtained is converted into an electrical signal by the image sensor 16, and the electrical signal is recorded on the disk by the disk driving circuit 19.

In the above-described photographic cycle, if flash light is required and available, the system controller 21 causes the flash circuit 2 to trigger the flash tube 1. When the system controller 21 determines through the sensor 24 that the required amount of emission has been reached, the system controller 21 stops the emission of the flash tube 1 through the flash circuit 2.

Figure 2:
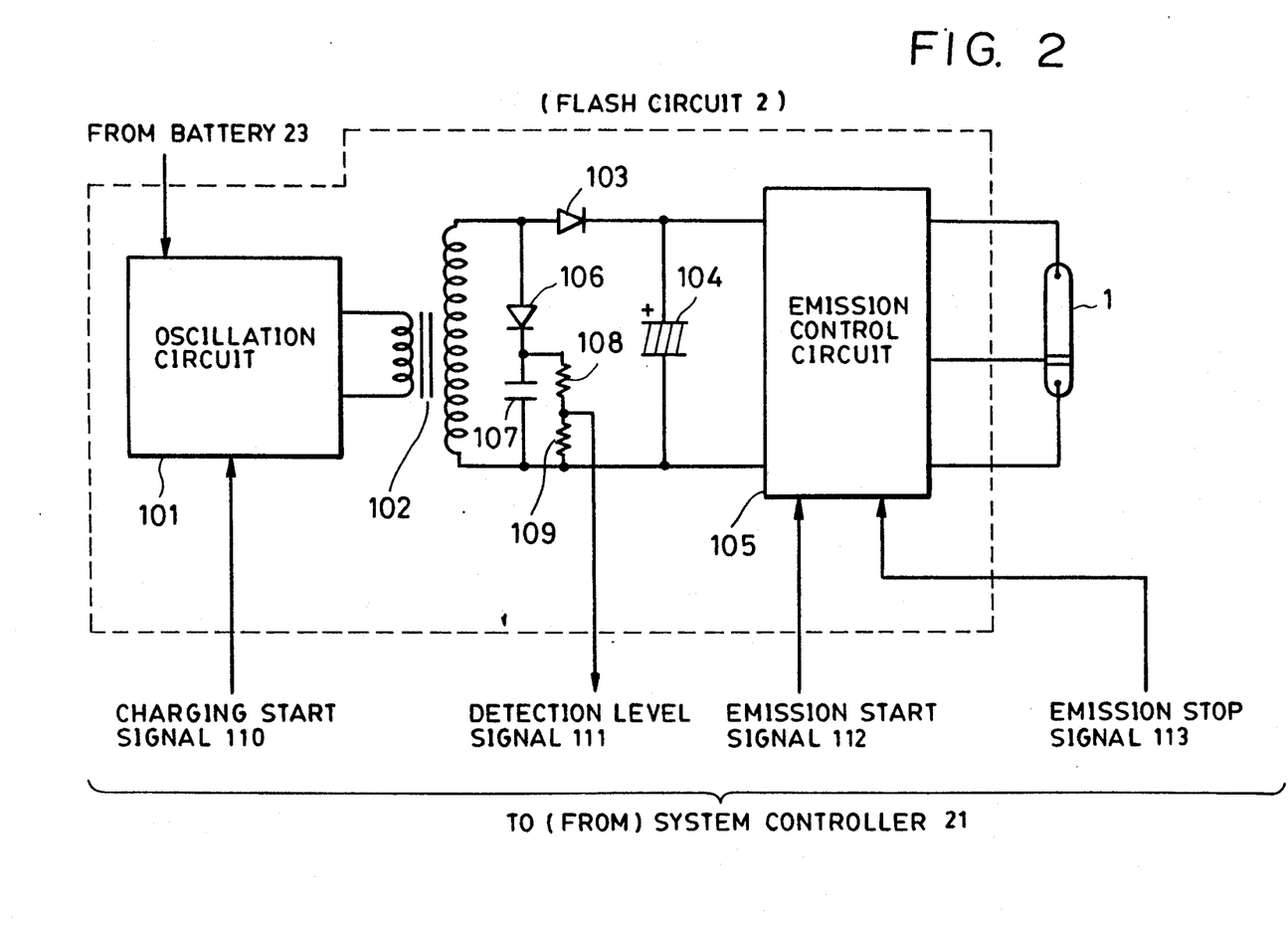
FIG. 2 is a circuit diagram of the flash circuit shown in FIG. 1.

The flash circuit 2 now will be explained in detail with reference to FIG. 2.

An oscillation circuit 101 oscillates in response to a charging operation start signal 110 and starts charging a main capacitor 104 through a transformer 102 and a diode 103. An emission control circuit 105 controls the start and stop of emission of the flash tube 1. The emission control circuit 105 may be of a type which is used in a conventional emission control type flash device. The emission control circuit 105 receives an emission start signal 112 and an emission stop signal 113 from the system controller 21. A diode 106 senses a peak voltage, i.e., the charged voltage of the main capacitor 104, during oscillation, and a capacitor 107 converts the peak voltage into a DC voltage. Voltage dividing resistors 108 and 109 divide the DC voltage into appropriate levels of voltages, and one of the divided voltages is supplied to the system controller 21 as a detection level signal 111.

In a conventional system, when the voltage level indicated by the detection level signal 111 reaches a predetermined first voltage, it is determined that the main capacitor 104 has been charged, namely, that a flash operation is possible. Subsequently, when the voltage level indicated by the detection level signal 111 reaches a predetermined second voltage, it is determined that the main capacitor 104 has been fully charged, and the charging operation start signal 110 is turned off. The levels of the first and second voltages may be selected to be equal to each other.

In the conventional system, however, since the first voltage is set to a value which makes it possible to cope with all the possible conditions that may be experienced with the camera, it has been impossible to avoid the problem that the flash device cannot be utilized until the charge level reaches a higher voltage level than would otherwise be necessary.

The maximum amount of emission of an emission-control type flash device is generally represented by a guide number, which is expressed in terms of a value approximately proportional to the second power of the energy. For example, a flash device which can cover a range of 5 meters for an aperture stopped down at f2.8 has a guide number "14" ($2.8 \times 5$).

If an object is 2.5 m away from the flash device with a guide number of 14, it is possible to select from among three methods of flash operation: 1) In the case of a flash-auto type, it may be fully flashed with the aperture value stopped down to f5.6 ($14/2.5$); 2) In the case of an emission-control type flash device, it may be flashed at an intensity corresponding to a quarter of the full emission, that is, the guide number "7" ($2.8 \times 2.5$); and 3) a combination of the two methods may also be utilized. In this method, the aperture is set to an f-number between 5.6 and 2.8 and the flash device is flashed at the required intensity.

In the methods 2) and 3), the flash device need not necessarily be fully charged. For example, when the distance to an object is D meters for the minimum aperture f2.8, if the guide number $G > D \times 2.8$, emission control is possible, i.e., the required intensity can be satisfied even if the flash device is not fully charged.

As is known, an electronic camera is capable of providing two photographic modes which differ in sensitivity, i.e., a field mode and a frame mode, by altering the operating mode of the image sensor 16. The gain of the signal processing circuit 17 also can be adjusted to change the effective sensitivity.

In other words, unlike the standard manner of using a flash device, if the sensitivity is increased by a factor of n, the flash device can be utilized even in a situation corresponding to the guide number $G > D \times 2.8/\sqrt{n}$.

Accordingly, the lower limit of the required guide number, namely, the lower limit of the charge level of the main capacitor 104 which represents the completion of the charging operation can be decreased to some extent in accordance with the object distance, the operating mode of the sensor and the gain of a signal processing system.

If a flash device which has already been charged to a certain guide number is used, sufficient intensity cannot be obtained for an f-number F which does not satisfy the condition $F < G/D \times \sqrt{n}$.

As the f-number F is larger within the above range, the flash device flashes at an intensity closer to the guide number "G". In other words, since the flash device emits light for the longest possible duration, the accuracy of emission will be improved. However, since a large amount of energy is consumed by such an operation, the next charging time becomes long.

The operation of an electronic camera which can provide reasonable control by utilizing the above-described arrangement will be explained below with reference to the flowcharts of FIGS. 3, 4 and 5.

Figure 3:
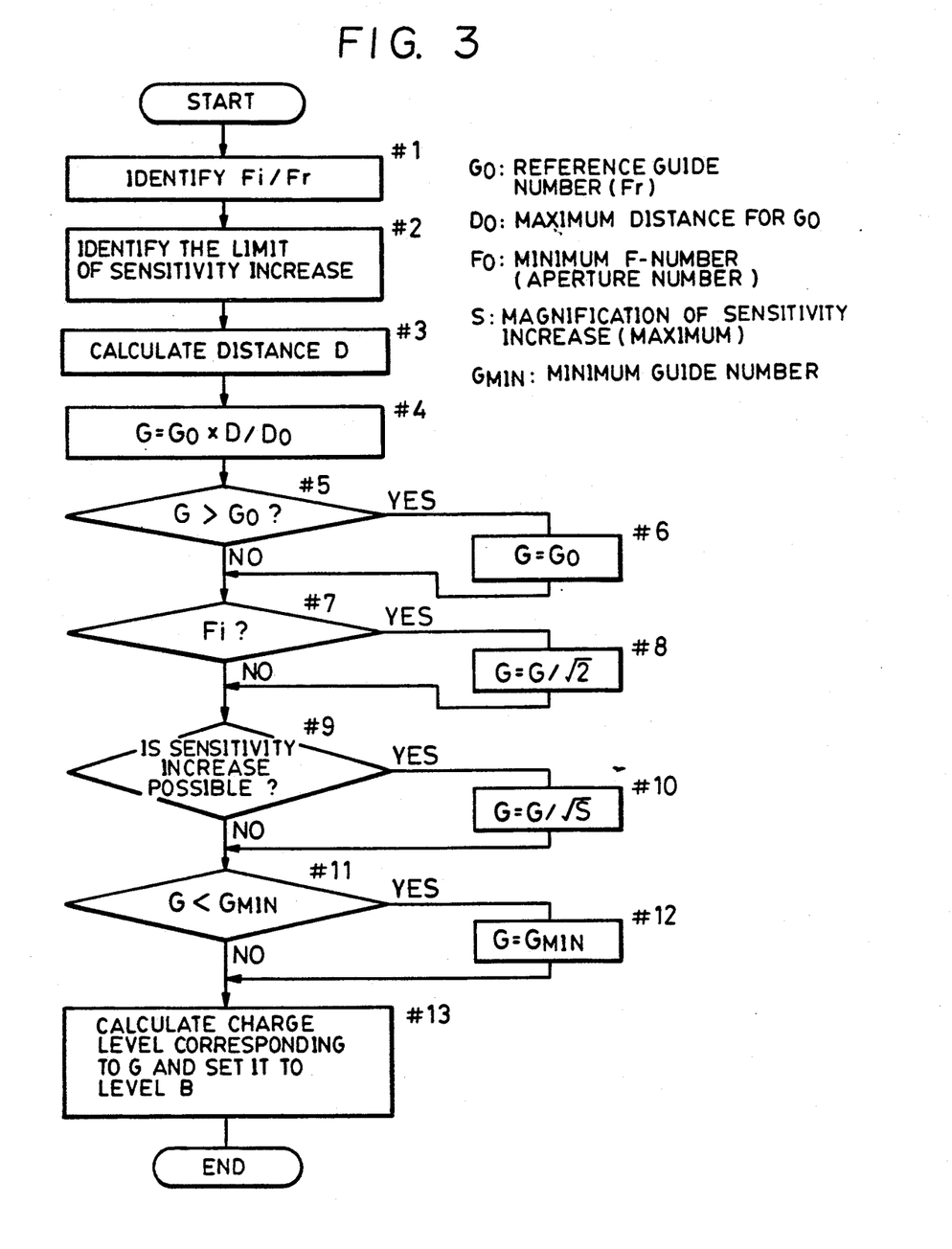

Referring first to FIG. 3, a method of calculating the required charge level will be explained.

In Step #1, it is determined whether the photographic mode set by external operating means (not shown) is a field mode (Fi mode) or a frame mode (Fr mode). In Step #2, the upper limit of sensitivity increase is calculated and, in Step #3, the distance measurement system 3 is activated to obtain a distance D to an object. The selection of the photographic mode is made by actuating a predetermined switch in a switch group SWS (FIG. 1).

In Step #4, the required guide number G is calculated from the ratio of the distance D to a distance D0 corresponding to a standard (maximum) guide number G0 (Fr mode). If it is determined in Step #5 that G is greater than G0 ($D > D0$), the process proceeds to Step #6; otherwise, the process proceeds to Step #7. In Step #6, G is set to G0 ($G = G0$). The guide number G0 is a value which can assure illumination of sufficient intensity when the distance D is smaller than or equal to G/F0, where F0 represents the minimum f-number of a photographic lens. Then, the process proceeds to Step #7.

Through Steps #7 to #12, the required corrections, such as sensitivity increase, are effected in accordance with whether the Fi mode or the Fr mode is selected. If intensity which can cover a range beyond the distance D0 is required, a comparison between the guide number G and the maximum guide number G0 is preferably performed after the sensitivity increase.

In Step #11, the guide number G is compared with a minimum guide number GMIN determined by a minimum voltage which allows the flash tube 1 to emit light. If the guide number G is greater than, or equal to, the minimum guide number GMIN, the process proceeds to Step #13. If the guide number G is smaller than the minimum guide number GMIN, the process proceeds to Step #12, where G is set to GMIN, and the process proceeds to Step #13.

In Step #13, a charge level corresponding to the guide number G is calculated. The charge level may be calculated from the G/G0 ratio which is approximately proportional to the charge level. More precisely, the charge level may be calculated by interpolation utilizing a polynomial expression such as "$a \times (G/G0)^2 + b \times (G/G0) + C$" or a table which shows the relationship between the guide number G and the charge level.

Next, a process for calculating the f-number F used in the above emission control will be explained with reference to the flowchart of FIG. 4.

In Step #21, the guide number G is calculated in accordance with the flowchart of FIG. 3 as described above.

In Step #22, a maximum guide number G' is calculated from the current charge level. This charge level is detected by sensing the detection level signal 111 shown in FIG. 2. The process for calculating the guide number G' is the reverse of the process for calculating the charge level and may be obtained by utilizing a similar expression or table.

In Step #23, it is determined whether the Fi mode is selected. If the Fi mode is selected, the process proceeds to Step #24, where the required amount of emission is $1/\sqrt{2}$, and the guide number G' needed to calculate the f-number is multiplied by $\sqrt{2}$. In Step #25, the f-number F is calculated from the distance D and the guide number G'. In Step #26, the f-number F is compared with the minimum f-number F0. If the f-number F is smaller than the minimum f-number F0, the process proceeds to Step #27, where the sensitivity is increased by the minimum required value S'. In Step #28, the f-number F is corrected correspondingly.

If the f-number F is greater than or equal to the minimum f-number F0, the process proceeds to Step #29, where the f-number F is divided by K1 ($4 > K1 \geq 1$). In Step #30, it is determined whether a continuous shooting mode is selected. If the continuous shooting mode is selected, the process proceeds to Step #31; otherwise, the process proceeds to Step #32. In Step #31, the f-number F is divided by K2 ($4 > K2 \geq 1$) in order to reduce the intervals between successive charging cycles during continuous shooting. In Step #32, the f-number F is compared with the minimum f-number F0. If the f-number F is smaller than the minimum f-number F0, the process proceeds to Step #33, where the f-number F is set to the minimum f-number F0.

The f-number F is calculated in the above-described manner, and the level of sensitivity increase is corrected in accordance with whether the Fi mode or the Fr mode is selected and emission control is performed.

Figures 5, 5A:
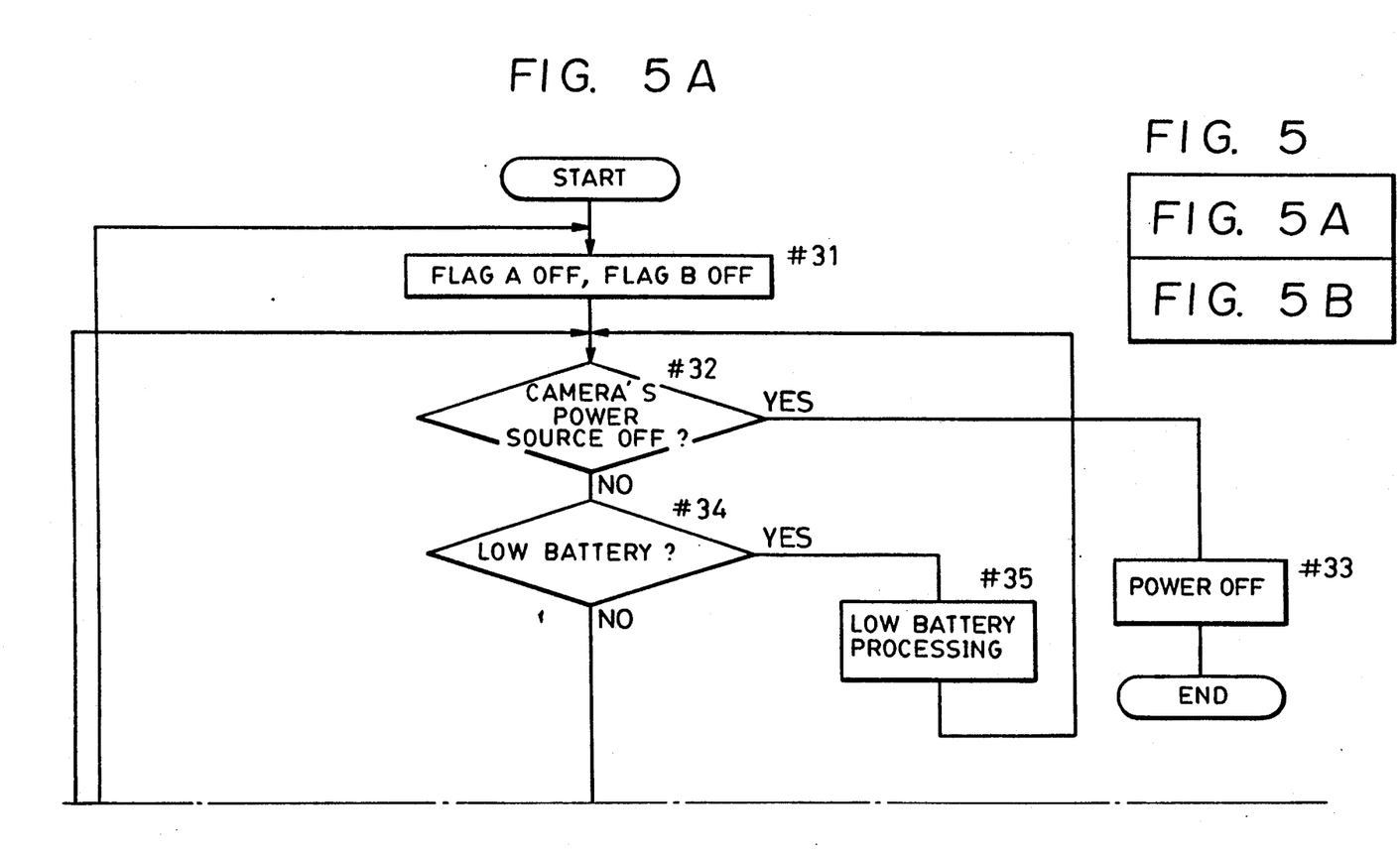
Figure 5B:
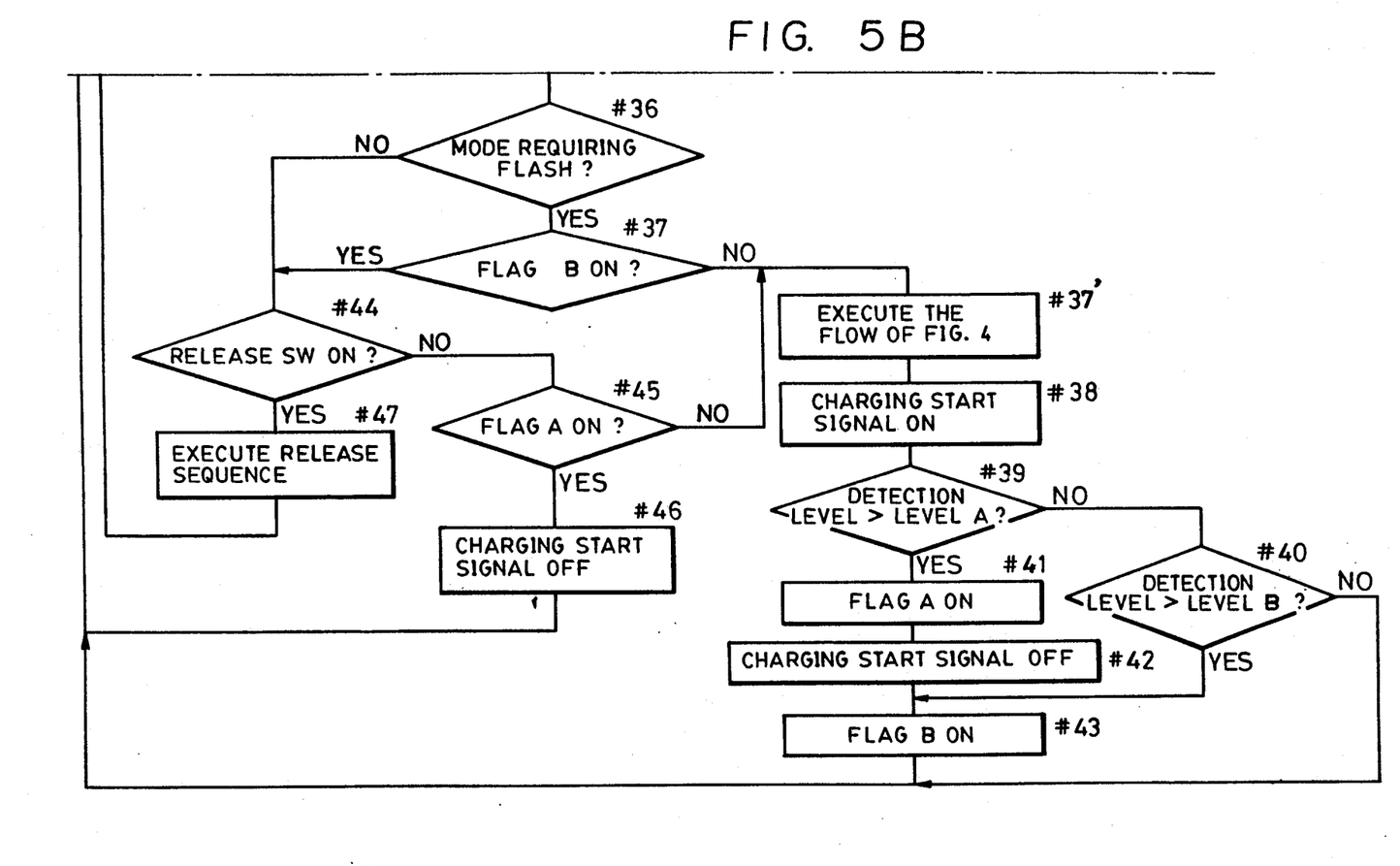

The operation of the electronic camera according to the first embodiment will be explained below with reference to the flowchart of FIG. 5.

In Step #31, flags A and B are turned off and, in Step #32, it is detected whether the release button 22 has been pressed by the first stroke. If the release button 22 has been pressed by the first stroke, the process proceeds to Step #34, where the voltage level of the battery 23 is checked. If the level of voltage is sufficiently high, the process proceeds to Step #36, wherein it is determined whether a flash operation is required. If the answer is "YES", the process proceeds to Step #37. The decision in Step #36 may be made by determining whether the exterior brightness is low on the basis of the photometric output from the sensor 24 or by setting a predetermined switch in the switch group SWS to a manual flash mode by means of an external setting member. In Step #37, whether the flag B is on is determined and, if the answer is "NO", the process proceeds to Step #37'. In Step #37', the flowchart shown in FIG. 4 is executed and the process proceeds to Step #38. In Step #38, the charging start signal 110 shown in FIG. 2 is transmitted to the oscillation circuit 101, whereby the oscillation circuit 101 starts oscillation In Step #39, the charging operation start signal 111 is detected and it is determined whether the charge level exceeds a level A. If the charge level does not exceed the level A, the process proceeds to Step #40, where it is determined whether or not the charge level exceeds a level B. In this embodiment, it may be assumed that the level A is greater than the level B. If the charge level does not exceed the level B, the process returns to Step #32 to repeat the above-described steps. While the above steps are being repeated, if the charge level is greater than the level B, the process proceeds to Step #43, where the flag B is turned on. Thereafter, Steps #32, #34, #36 and #37 are executed and the process proceeds from Step #37 to Step #44. In Step #44, it is determined whether the release button 22 has been pressed by the second stroke. If the release button 22 has not yet been pressed by the second stroke, the process proceeds to Step #45; otherwise, the process proceeds to Step #47, where a release sequence is executed.

Figure 4:
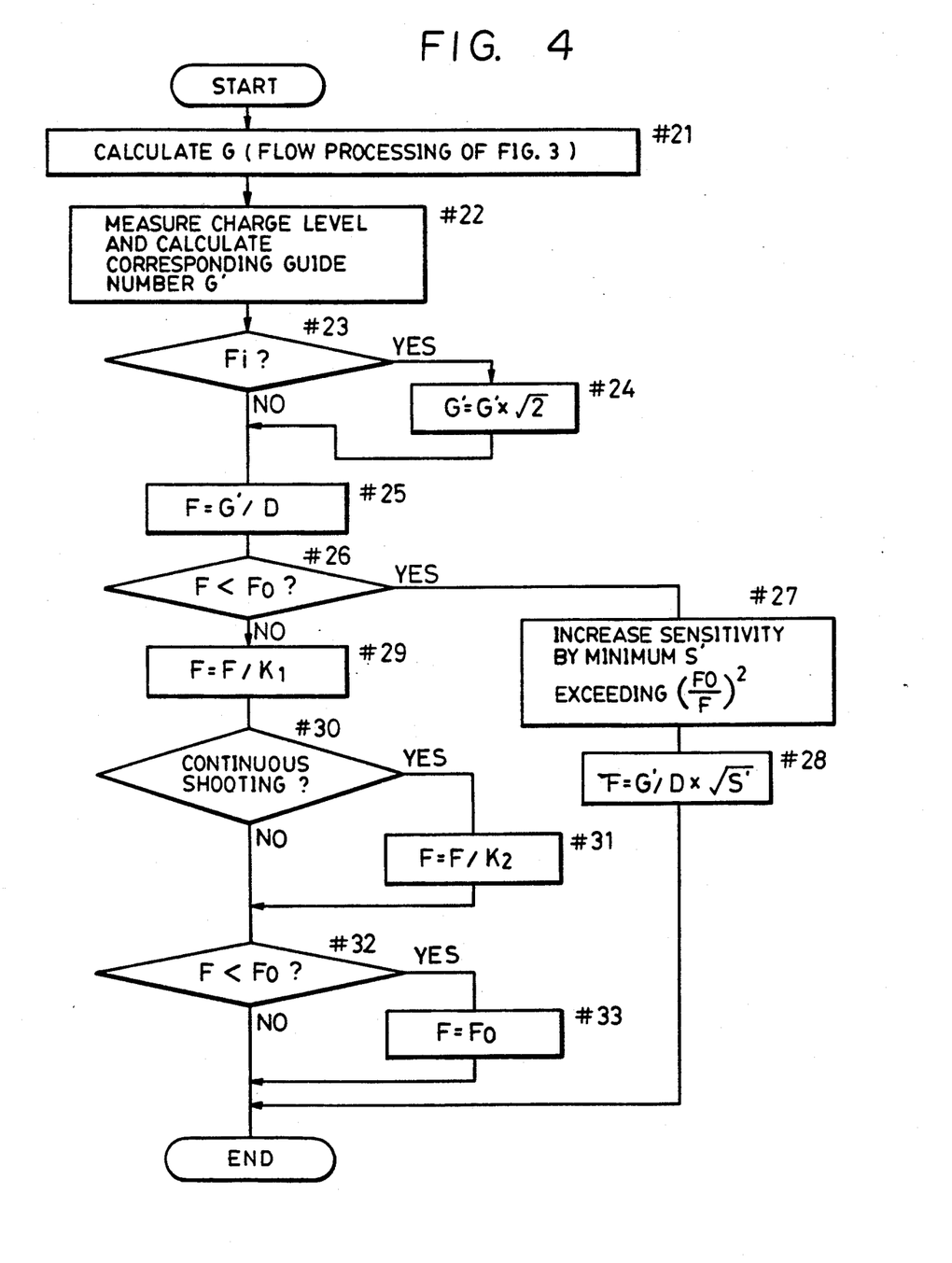

In the release sequence, the aperture value is set to the f-number F calculated in the flowchart of FIG. 4, the lens element 10 is moved to a focus position corresponding to the measured distance to the object, and the shutter 14 is then actuated for photographing purposes.

In the first embodiment described above, the completion of the charging of the main capacitor 104 is completed is controlled with reference to the state of the camera, for example, the distance to an object, the operating mode of the image sensor and the upper limit of the gain increase of the imaging system. Accordingly, the time required to complete the charging operation is reduced If flash photography is performed with charge energy which is set in the above manner, insufficient exposure may result. However, since the f-number can be altered, that is, the aperture value of the photographic lens is increased, according to the charge level as required, proper exposure can be assured.

Moreover, the f-number is altered according to the level of sensitivity increase and the operating mode of the image sensor so that an accurately controlled exposure can be achieved. In addition, the f-number can be altered according to whether the continuous shooting mode is selected, whereby the charge level corresponding to the completion of charging can be decreased when the camera is used in the continuous shooting mode. Accordingly, it is possible to provide a camera whose speed of continuous shooting is increased.

As described above, in the first embodiment, the charge level of the main capacitor 104 is set on the basis of the distance to an object, the operating mode of the image sensor, and the upper limit of the increase of the imaging system. Since proper exposure is not necessarily obtained by flash control based on the charge level only, the f-number is altered according to the charge level. However, the f-number may not be altered for only the above-described purposes. For example, to reduce charge time, it is also preferable to utilize an arrangement in which, when the charge level reaches a certain level, the charging operation is stopped to alter the f-number according to the available charged voltage.

Although the f-number is altered by detecting the upper limit of gain increase, the operating mode of the image sensor, and the presence or absence of the continuous shooting mode, the f-number may also be altered by detecting any one of the foregoing factors.

In the first embodiment, it has been explained that evaluation is performed for every photographic sequence. However, if the value of sensitivity or aperture alters during continuous shooting, proper exposure may not be obtained. For this reason, it is preferable to fix the aperture value during continuous shooting. In this case, the corresponding guide number, namely, a charge level to be detected, is, of course, to be calculated on the basis of the fixed aperture value.

Figure 6:
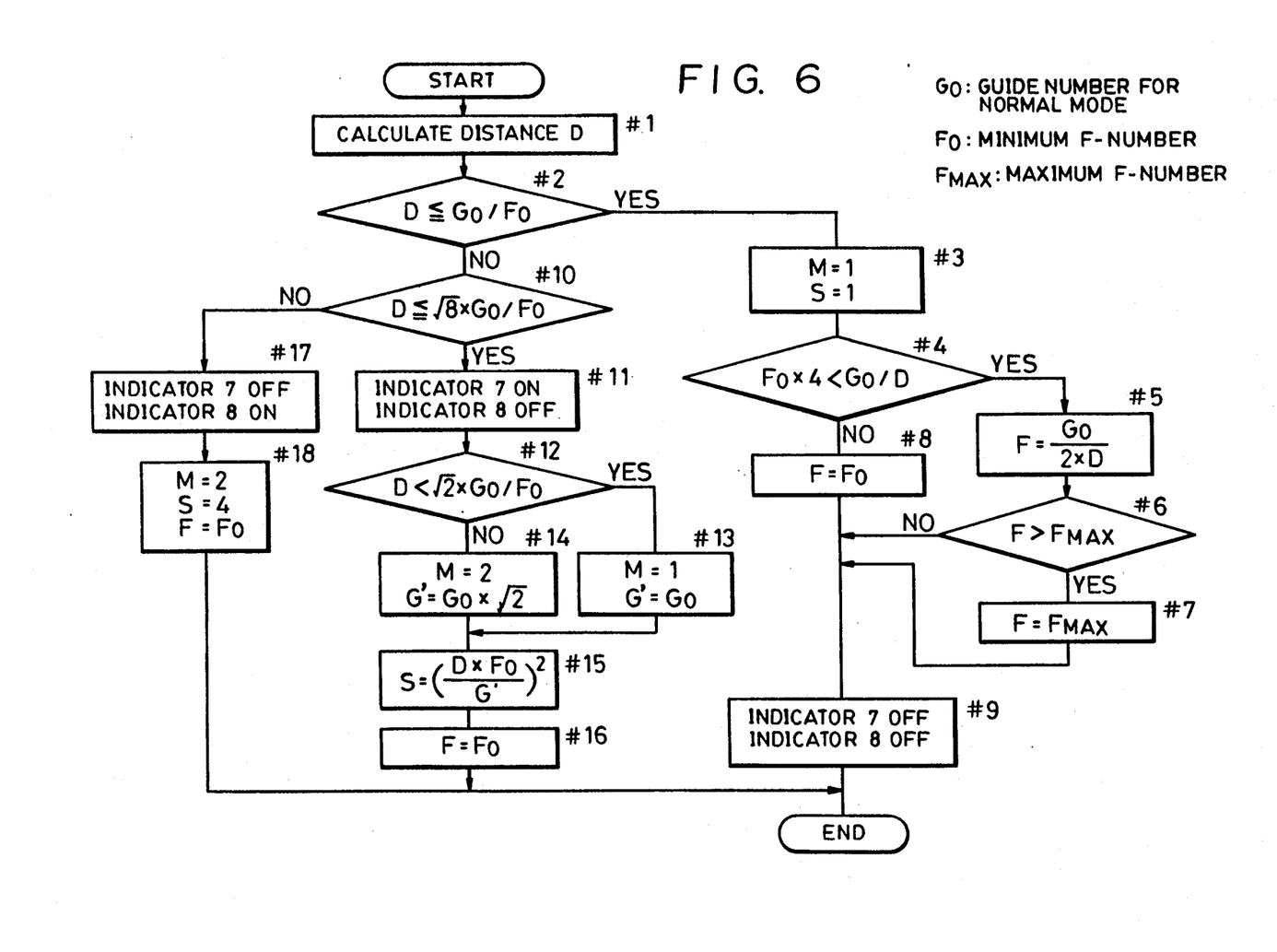
FIG. 6 is a flowchart showing a control program for a second embodiment of the present invention.

FIG. 6 is a flowchart showing a second embodiment of the present invention. Since the arrangement of the second embodiment is substantially the same as that of the first embodiment, the operation will be explained below only with reference to the flowchart of FIG. 6.

As in the first embodiment, the flash device used in the second embodiment can also illuminate an object located at the distance $D = G/F0$, where G0 is the guide number of the flash device (corresponding to the standard usage of an image sensor employed) and F0 is the minimum f-number of a photographic lens.

In addition, if the sensitivity may be increased by M times by switching the readout mode of the image sensor from frame-read mode to field-read mode and, by S times, by increasing the gain of the signal processing system, the second embodiment will make it possible to control the intensity of illumination over the range $D = G/F0\sqrt{S} \times \sqrt{M}$.

The second embodiment is applied to a camera in which M is 1 or 2 with S being equal to 1,2,3 or 4. If emission is controllable for $M = S = 1$, the camera provides no indication. If emission can be controlled by increasing M and S, the camera provides a warning indication 1, while, if no emission can be controlled even by increasing M and S, the camera provides a warning indication 2.

Referring to the flowchart of FIG. 6, in Step #1, the distance measurement system 3 measures the distance D to an object.

In step #2, it is determined whether or not $D \leq G0/F0$ is satisfied. If the answer is "YES", that is $S = M = 1$ is approximately satisfied, the process proceeds to Step #3, where S and M are set to "1" and the indicators 7 and 8 shown in FIG. 1 are turned off. In this operation, if the value of the distance D is sufficiently small, the f-number F is preferebly made slightly greater that the maximum f-number FMAX as shown in Steps #4–#7, whereby control accuracy can be improved.

It is determined in Step #2 that D is greater than G0/F0, for a proper exposure, sufficient illumination is not available. The process therefore proceeds to Step #10, where M and S are set to "2" and "4", respectively, that is, the sensitivity is increased by eight times (2×4). If sufficient illumination is still not available, that is, $D > \sqrt{8} \times G0/F0$ in Step #17, only the indicator 8 is turned on to provide the warning indication, "2". Then, in Step #18, M and S are set to "2" and "4", respectively, and the f-number is set to the minimum f-number F0.

In the case of $G0/F0 < D \leq \sqrt{8} \times G0/F0$, the process proceeds from Step #10 to Step #11, where only the indicator 7 is turned on to provide the warning indication, "1". Then, if it is determined in Step #12 that $D < \sqrt{2} \times G0/F0$ is satisfied, the process proceeds to Step #13, where M and G' are set to "1" and "G0", respectively. Subsequently, in Step #15, S is set to $$\left(\frac{D \times F_0}{G'}\right)^2$$

and, in Step #16, the f-number F is set to the minimum f-number F0.

If it is not determined in Step #12 that $D < \sqrt{2} \times G0/F0$ is satisfied, the process proceeds to Step #14, where M and G' are set to "2" and "$G0 \times \sqrt{2}$", respectively. Subsequently, Steps #15 and #16 are executed.

In the above-described operation, in the case of $D \leq G0/F0$, M and S are each set to "1" and the frame mode is selected with the gain level remaining "1", to execute photography.

In the case of $G0/F0 < D < \sqrt{2} \times G0/F0$, the gain level is set to $$\left(\frac{D \times F_0}{G'}\right)^2$$

and the aperture value is set to the minimum f-number F0 to execute photography in the frame mode.

In the case of $\sqrt{2} \times G0/F0 \leq D \leq \sqrt{8} \times G0/F0$, the field mode is selected, the gain level is set to $$\left(\frac{D \times F_0}{G_0 \sqrt{2}}\right)^2,$$

and the aperture value is set to the minimum f-number F0, to execute photography.

Figure 7:
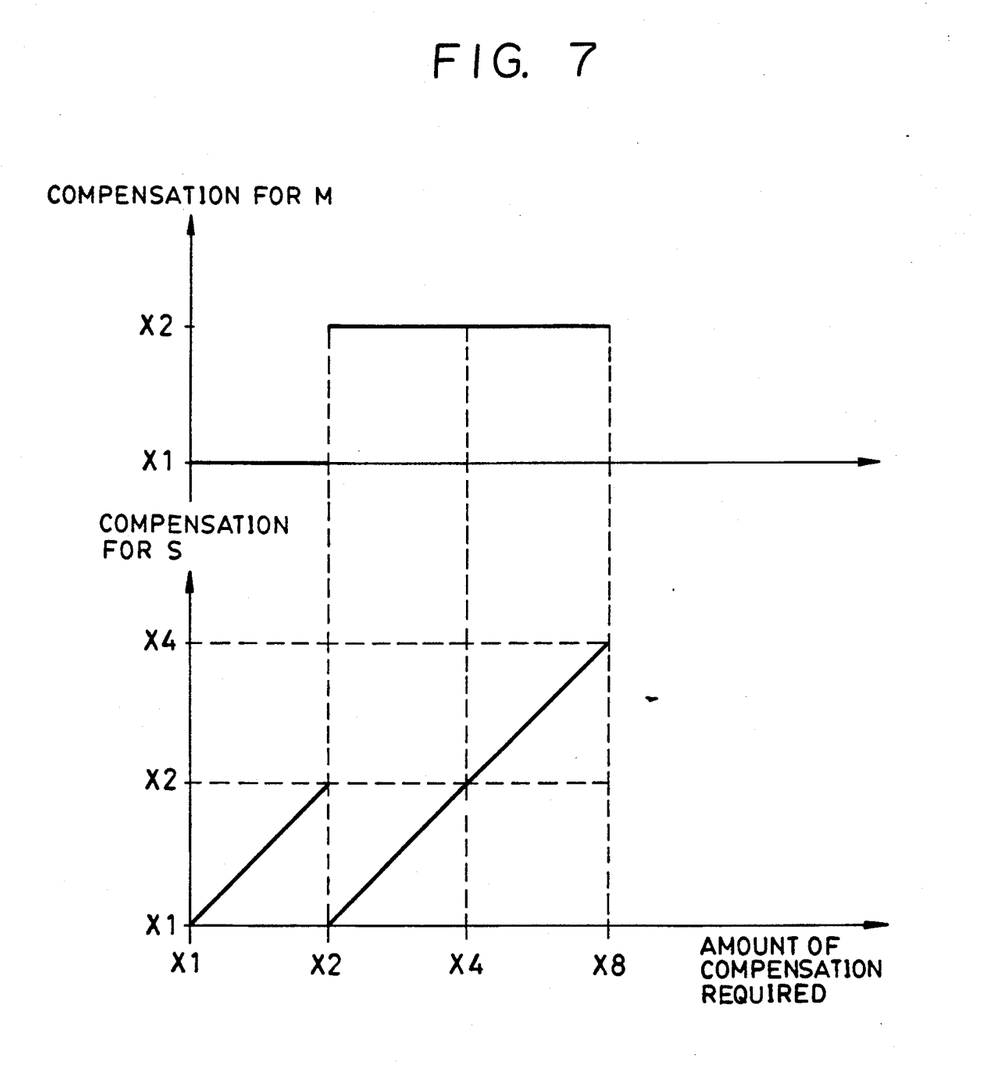
FIG. 7 is a waveform diagram which serves to illustrate the operation of the second embodiment of FIG. 6.

As described above, in the second embodiment, it is possible to correctly increase an illumination range by $\sqrt{8}$ time (approximately 3 times) by setting M and S as shown in FIG. 7 according to the distance D.

In the second embodiment, information obtained from an AF system, that is, information on object distance, is utilized to determine whether or not the flash intensity is sufficient, and the result is indicated so that a user can be informed whether the intensity of flash illumination is sufficient. In addition, if the intensity of flash illumination is insufficient, sensitivity compensation is automatically executed. Accordingly, it is possible to substantially reduce the possibility that users will fail in photography because of the insufficiency of the intensity of flash illumination if the distance to an object is excessively long.

In the second embodiment, although M or S is compensated for according to the distance D, the accumulation of charge in the image sensor 16, that is, flashing, and reading therefrom are not executed at the same time in practice. Accordingly, at least either M or S may be calculated form the sensor output of an emission control sensor, and it is therefore possible to perform calculations which take the reflectance of the object into account.

However, in the case of the above calculations, it is necessary to pay attention to the fact that detection, control, and readout are executed in a short time.

In the second embodiment, each warning indication is provided according to whether or not D is equal to $\sqrt{8} \times G0 \times D0$. However, a warning indication of underexposure may be provided within the permissible tolerance of $\pm 0.5$ V, for example, according to whether $D = \sqrt{16 \cdot G0/D0}$ is satisfied.

The second embodiment has been explained with reference to the example in which reading from the image sensor 16 and recording on the disk are executed at the same time. However, if a system arrangement utilizing a buffer, such as a so-called semiconductor memory, is used, the amount of signal charge stored in the buffer can be detected to compensate for the signal charge during or after a reading operation if necessary, for example, by means of gain increase, or a combination of gain increase and a low-pass filter.

Even in an automatic-exposure mode, by evaluating the intensity of illumination during charge accumulation in the image sensor, the accuracy of the gain compensation of the second embodiment can be further improved compared to the gain compensation of the general type utilizing information prepared previously.

To increase sensitivity, the second embodiment is arranged to alter the operating mode of the image sensor (to switch the frame mode and the field mode) or to increase the gain of an image signal. However, the present invention is not limited to such an arrangement and, for example, the sensitivity may also be increased by altering the characteristics of an optical filter, or by moving a part of or the whole of the optical filter out of the photographic optical path.

Although the second embodiment is arranged to automatically increase photographic sensitivity if the intensity of flash illumination is not sufficient, the present invention is not limited to this arrangement. For example, a warning indication, which requests a user to execute the operation of increasing photographic sensitivity, may also be provided. In accordance with the warning indication, the user may manually switch the operating mode of the image sensor from the frame mode to the field mode. In this arrangement, the user may continue to increase sensitivity until the above warning indication disappears. The warning indication may also be provided by means of an audible signal.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. In a flash photographic apparatus including a main capacitor and a flash device, comprising:
   a) a charging completion signal generating circuit arranged to detect a charged voltage of said main capacitor of said flash device and to generate a charging completion signal when the charged voltage reaches a predetermined level;
   b) an image recording circuit having a field mode and a frame mode as the image recording modes of the flash photography apparatus;
   c) a level setting circuit for setting the predetermined level of said charging completion signal generating circuit to a low level when said field mode is selected and to a high level when said frame mode is selected; and
   d) a control circuit for activating a predetermined function of the flash photographic apparatus in response to the charging completion signal from said charging completion signal generating circuit.

2. A flash photographic apparatus according to claim 1, further comprising a photographic operation release member, wherein said control circuit is a release control circuit responsive to the operation of a release member for effecting a release operation, said release control circuit being allowed to respond to the operation of said release member in response to the charging completion signal.

3. In a camera arranged to effect flash photography by means of a flash device for generating photographic illumination, said camera comprising:
   a) distance information generating means for generating distance information with respect to an object to be photographed;
   b) a sensitivity setting circuit for setting sensitivity information;
   c) an intensity control circuit for controlling the flash means to set the intensity of photographic illumination on the basis of sensitivity information set by said sensitivity setting circuit;
   d) a sensitivity adjustment circuit for determining sensitivity for said sensitivity setting circuit on the basis of the distance information generated by said distance information generating means; and
   e) an image recording circuit having a frame mode and a field mode as image recording modes, said sensitivity adjustment circuit being arranged to select either one of the frame mode and the field mode on the basis of the distance information.

4. A camera according to claim 3, further comprising a light receiving element for receiving incident light and providing an output, and a processing circuit for processing the output from said processing circuit, said light receiving circuit being arranged to adjust the gain of said processing circuit.

5. A camera system arranged to effect flash photography by means of a flash device for generating illumination, said system comprising:
   a) a distance information generating circuit for providing distance information with respect to an object to be photographed;
   b) a recording circuit having a light receiving element for receiving light from the object, wherein said recording circuit processes an electric signal in accordance with the light received by said light receiving element and records information received by said light receiving element;
   c) a setting circuit for setting a sensitivity for the signal to be processed by said recording circuit; and
   d) an adjustment circuit for adjusting the sensitivity set by said setting circuit on the basis of the distance information.

6. A camera system according to claim 5, wherein said recording circuit comprises a processing circuit for processing the electric signal in accordance with the light received by said light receiving element of said recording circuit, said adjustment circuit adjusting a gain of said processing circuit.

7. In a flash photographic apparatus including a main capacitor and a flash device, said apparatus comprising:
   a) a charging completion signal generating circuit arranged to detect a charged voltage of said main capacitor wherein to generate a charging completion signal when the charged voltage reaches a predetermined level;
   b) an image recording circuit having a field mode and a frame mode as the image recording modes; and
   c) a level setting circuit for setting the predetermined level of said charging completion signal generating circuit, said level setting circuit setting different levels depending on whether the mode of said image recording circuit is the field mode or the frame mode.

8. In a flash photographic apparatus according to claim 7, said flash photographic apparatus further comprising a distance information generating circuit for generating distance information with respect to an object to be photographed, wherein the predetermined level is set on the basis of the distance information.

9. A camera system arranged to effect flash photography by means of a flash device for generating illumination, said system comprising:

a) a distance information generating circuit for providing distance information with respect to an object to be photographed;

b) an image recording circuit having a field mode and a frame mode as the image recording modes; and c) a selecting circuit for selecting the field mode or the frame mode on the basis of the distance information.

10. A camera system according to claim 9, wherein said selecting circuit selects the frame mode when said distance information represents a relatively short distance and selects a field mode when said distance information represents a relatively long distance.

11. A camera system according to claim 10, wherein said image recording circuit comprises:

a) a light receiving element for receiving light from an object to be photographed;

b) a processing circuit for processing the electric signal in accordance with light received by said light receiving element; and c) an adjusting circuit for adjusting a gain of said processing circuit on the basis of the distance information.

12. In a flash photographic apparatus including a main capacitor and a flash device, said apparatus comprising:

a) a detecting circuit for detecting a charged voltage of said main capacitor;

b) an adjusting circuit for adjusting an exposure control factor value on the basis of charged voltage detected by said detecting circuit; and c) an image recording circuit having a field mode and a frame mode as the image recording modes;

wherein when said adjusting circuit adjusts the value of the exposure control factor for the same charged voltage as a function of whether the mode of said image recording circuit is the field mode or the frame mode.

13. In a flash photographic apparatus according to claim 12, said exposure control factor is diaphragm value.

* * * * *

UNITED STATES PATENT AND TRADEMARK OFFICE
CERTIFICATE OF CORRECTION

PATENT NO. : 5,075,715

DATED : December 24, 1991

INVENTOR(S) : Shinji Sakai

It is certified that error appears in the above-identified patent and that said Letters Patent is hereby corrected as shown below:

COLUMN 2:

Line 14, "detect," should read --detect--.
    Line 22, "increase" should read --increased--.
    Line 25, "voltage," should read --voltage--.
    Line 44, "selected A" should read --selected. A--.

COLUMN 3:

Line 1, "With" should read --with--.
    Line 5, "c" should read --of--

COLUMN 8:

Line 7, delete "is com-".
    Line 8, delete "pleted".
    Line 65, "D=G/FO," should read --D=GO/FO,--.

COLUMN 9:

Line 30, "It" should read --If it--.

UNITED STATES PATENT AND TRADEMARK OFFICE
CERTIFICATE OF CORRECTION

PATENT NO. : 5,075,715

DATED : December 24, 1991

INVENTOR(S) : Shinji Sakai

It is certified that error appears in the above-identified patent and that said Letters Patent is hereby corrected as shown below:

COLUMN 10:

Line 20, "time" should read --times--.
   Line 40, "form" should read --from--.

COLUMN 11:

Line 23, "beer" should read --been--.

COLUMN 12:

Line 51, "wherein" should read --and--.

Signed and Sealed this

Twenty-second Day of June, 1993

Attest:

MICHAEL K. KIRK

*Attesting Officer*    Acting Commissioner of Patents and Trademarks